United States Patent
Premont et al.

(10) Patent No.: US 7,132,765 B2
(45) Date of Patent: Nov. 7, 2006

(54) SWITCH MODE POWER SUPPLY HAVING ONLY ONE INDUCTIVE ELEMENT AN SEVERAL OUTPUTS AND METHOD OF CONTROLLING SAME

(75) Inventors: Christophe Premont, Sassenage (FR); Louis Tallaron, Saint-Egreve (FR); Severin Trochut, Gilly (FR)

(73) Assignee: STMicroelectronics S.A., Montrouge (FR)

( * ) Notice: Subject to any disclaimer, the term of this patent is extended or adjusted under 35 U.S.C. 154(b) by 508 days.

(21) Appl. No.: 10/726,259

(22) Filed: Dec. 2, 2003

(65) Prior Publication Data

US 2004/0160715 A1 Aug. 19, 2004

(30) Foreign Application Priority Data

Dec. 5, 2002 (FR) .................... 02 15369

(51) Int. Cl.
*H02J 1/00* (2006.01)
(52) U.S. Cl. .......................... 307/81; 307/80
(58) Field of Classification Search ............ 307/80, 307/81
See application file for complete search history.

(56) References Cited

U.S. PATENT DOCUMENTS

| | | |
|---|---|---|
| 5,617,015 A | 4/1997 | Goder et al. |
| 6,075,295 A | 6/2000 | Li |
| 6,222,352 B1 | 4/2001 | Lenk |
| 2002/0011824 A1 | 1/2002 | Sluijs |

OTHER PUBLICATIONS

French Search Report, FR 0215369, dated Sep. 9, 2003.

*Primary Examiner*—Robert L. Deberadinis
(74) *Attorney, Agent, or Firm*—Jenkens & Gilchrist, PC (57) ABSTRACT

The switch mode power supply includes a switching cell SC controllable cyclically and including only one inductive element L and several individually selectable outputs. During each conduction cycle, a total power level corresponding to the sum of the individual power levels respectively required by all the outputs OUTi during this cycle is injected into the inductive element L, the outputs requiring a non-zero individual power level are selected successively and in a predetermined order that is identical for all the cycles, and, at each selected output, the corresponding individual power level is produced.

36 Claims, 9 Drawing Sheets

SWITCH MODE POWER SUPPLY HAVING ONLY ONE INDUCTIVE ELEMENT AN SEVERAL OUTPUTS AND METHOD OF CONTROLLING SAME

PRIORITY CLAIM

The present application claims priority from French Application for Patent No. 02 15369 filed Dec. 5, 2002, the disclosure of which is hereby incorporated by reference.

BACKGROUND OF THE INVENTION

1. Technical Field of the Invention

The present invention relates to switch mode power supplies and more specifically to those having only one inductive element and several regulated outputs. The invention is advantageously applicable to, but not limited to, portable systems powered by battery, in particular, but not exclusively, wireless remote communication system terminals, for example, cellular mobile telephones.

2. Description of Related Art

Integrated systems for controlling the power aspects of portable applications (battery operated) increasingly require different output supply voltages to be regulated. The traditional solution consists in creating a regulated supply from the power supply using a linear regulator. This regulator uses an external capacitor to fulfill its function. Further, as many linear regulators are used as there are outputs to be regulated. The main drawback of this type of regulator is its low efficiency.

To address this problem of low efficiency, switch mode power supplies, also known as "DC—DC converters," are used. Efficiency levels are then close to 85 to 90%, while under the same conditions, a linear regulator would have an efficiency of only 50%. However, the main drawback of a switch mode power supply is the need for both an external capacitor and an external inductive element.

To regulate several outputs, it is conceivable to use several switch mode power supplies. However, this then assumes using as many external inductive elements, the main drawback of such an approach being the cost of such an inductive element and the large surface area taken up by it on the printed circuit board.

It has also been considered to use switch mode power supplies capable of regulating several separate outputs using only one inductive element. The main solutions that exist in this field then rely on a time-division multiplexing of the power delivered to the various outputs. In other words, the various outputs to be regulated are fed respectively during successive conduction cycles.

The prior art solutions exhibit a number of drawbacks.

One of these concerns the implementation of a "discontinuous conduction" type regulation on the various outputs. Also, this type of conduction gives rise to high peak currents in the inductive element, thus resulting in a significant drop in efficiency (65 to 75% instead of 85 to 90%). Furthermore, to withstand the very high peak currents, the saturation current of the inductive element must be higher. Consequently, an inductive element having a larger volume must be used, which is a major constraint for portable applications. Furthermore, this type of conduction produces significant ripple on the regulated output voltage supplies. Another drawback concerns the use of complex digital functions taking up considerable surface area. These functions are for controlling the power delivered at the various outputs according to given algorithms. Another drawback concerns the fact that the conduction is, for most of the existing solutions, a pulse frequency modulation type conduction. This principle leads to significant and uncontrollable spectral pollution. Also, although in some applications, such as applications for supplying power to microcomputers or liquid crystal display screens, such a pollution is not critical, this pollution is unacceptable in other portable applications, such as cellular mobile telephones, and this means that switch mode power supplies using frequency modulation cannot be used.

SUMMARY OF THE INVENTION

One aim of the invention is to regulate various outputs that are independent in terms of power levels, using only one inductive element and a continuous type conduction at the various outputs. Such a continuous type conduction at the various outputs enables peak currents in the conductive element to be reduced. The saturation current of the inductive element used can thus be lower, and therefore the inductive element used is of smaller volume.

Another aim of the invention is to propose a Pulse Width Modulation (PWM) type conduction at the various regulated outputs. This means that the frequency spectrum of the various outputs can be perfectly controlled and that a switch mode power supply can be rendered fully compatible with a cellular mobile telephone application, for example.

The invention therefore proposes a method for controlling a switch mode power supply comprising a cyclically controllable switching cell and having only one inductive element and several outputs that can be selected individually.

According to one general feature of the invention, during each conduction cycle, a total power level corresponding to the sum of the individual power levels respectively required by all the outputs during this cycle is injected into the inductive element; the outputs requiring a non-zero individual power level are selected successively and in a predetermined order that is identical for all the cycles, and at each selected output, the corresponding individual power level is produced.

Thus, according to the invention, in the same conduction cycle, different outputs are driven in turn, if of course more than one output requires power. Furthermore, in each conduction cycle, each of the outputs will be "scanned" to determine those which require power. Also, by providing a predetermined order that is identical for all the cycles as regards the selection of outputs to be used to supply power, and consequently their operation, a continuous type conduction is ensured, that is to say a continuity of current in the inductive element from one cycle to the other.

In contrast, for devices of the prior art designed for time-division multiplexing the apparent frequency of each output was equal to the switching frequency divided by the number of outputs. Each output of the switch mode power supply according to the invention, however, has an apparent frequency equal to the switching frequency.

Furthermore, according to one embodiment of the invention, the switching cell of the switch mode power supply is advantageously controlled by pulse-width modulation.

According to one embodiment of the invention, the switching cell has, for each output, a capacitor having a terminal that is on the one hand electrically connected to the said output whether the said output is selected or not, and on the other hand electrically connected to the inductive element when the said output is selected.

Further, the determination of the total power includes for each output a determination of an individual error signal resulting from the comparison between the voltage at the said capacitor terminal and an individual reference voltage corresponding to the output voltage desired at the said output, and a summation of all the individual error signals so as to obtain a summation signal.

The capacitor, associated with each output, thus acts as an energy store to continue to supply the unselected output and maintain the voltage on the said output, until the latter is selected at its turn.

According to one embodiment of the invention, the injecting of the total power into the inductive element and its restitution are controlled during each conduction cycle by a main pulse signal resulting from the comparison between the summation signal and a ramp signal reinitialized at the start of each conduction cycle.

Furthermore, an output is selected during the said conduction cycle by an individual pulse signal resulting from the comparison between the ramp signal and an auxiliary signal obtained from at least one of the individual error signals.

The nature of the auxiliary signal depends in particular on the number of outputs of the power supply.

Thus, when the number of outputs is equal to two, the selection of an output includes the memorization (or sensing), at the start of the conduction cycle, of the results of the comparisons between each individual error signal and the ramp signal, and the auxiliary signal is then one of the individual error signals.

When the number nb of outputs of the switch mode power supply is greater than two, the selection of an output includes nb-2 predetermined partial summations of individual error signals. This selection also includes the memorization, at the start of the conduction cycle, of the results of the comparisons between each individual error signal and the ramp signal, and the memorization of the results of the comparisons between each partial summation signal and the ramp signal.

The auxiliary signal is then one of the individual error signals or one of the partial summation signals.

The switch mode power supply can be a step-down device, a step-up device, or both a step-down and step-up device.

In an advantageous application of the invention, the switch mode power supply can be incorporated in a terminal of a wireless communication system, for example a cellular mobile telephone containing a battery and an integrated circuit incorporating a processor.

The switch mode power supply is then fed for example by the terminal's battery and the voltage supply to the inputs/outputs of the integrated circuit is then regulated using the voltage available at an output of the switch mode power supply, while the power supply voltage to the processor is regulated using the voltage available at another output of the switch mode power supply.

The invention also proposes a switch mode power supply including a switching cell controllable cyclically by a control system, and including only one inductive element and several individually selectable outputs.

According to a general feature of the invention, the control system includes:

determination means capable, during each conduction cycle, of determining a total power level corresponding to the sum of the individual power levels respectively required by all the outputs during this cycle, and control means capable, during this cycle, of controlling the switching cell so as to inject into the inductive element the said total power, of selecting successively and in a predetermined order that is identical for all the cycles the outputs requiring a non-zero individual power level and of producing at each selected output the corresponding individual power level.

According to one embodiment of the invention, the control means include a preliminary stage capable of delivering pulse signals of modulated width, and a digital control stage, for example control logic forming a state machine, receiving the pulse signals and generating control signals for the switching cell.

According to one embodiment of the invention, the switching cell includes:

controllable selection means having an input terminal connected to the inductive element and several output terminals respectively connected to the outputs of the switching cell, and associated with each output, a capacitor having a terminal connected to the corresponding output terminal of the selection means.

The means for determining the total power include:

for each output an individual amplification means having a first input connected to the said terminal of the corresponding capacitor, and a second input receiving an individual reference voltage corresponding to the output voltage desired at the said output, and an output delivering an individual error signal, and a summation means the inputs of which are respectively connected to the outputs of the individual amplification means.

According to one embodiment in which the number of outputs is equal to two, the control means include a ramp generator capable of delivering, during each conduction cycle, a ramp signal reinitialized at the start of each cycle, and the preliminary stage includes:

a main comparator having a first input connected to the output of the summation means and a second input connected to the output of the ramp generator, and an output delivering a main pulse control signal, and, an individual comparator associated with each output of the switching cell and having a first input connected to the output of the corresponding individual amplification means and a second input connected to the output of the ramp generator, and an output delivering an individual pulse control signal.

The digital control stage:

controls the injection of the total power into the inductive element and its restitution during each conduction cycle based on the main pulse control signal, and controls the selection means during this conduction cycle based on one of the individual pulse control signals.

Furthermore, the control stage advantageously includes memorization means capable of memorizing, at the start of the conduction cycle, the values of the individual pulse control signals.

According to one embodiment of the invention in which the number nb of outputs is greater than two, the control means include a ramp generator capable of delivering, during each conduction cycle, a ramp signal reinitialized at the start of each cycle, and the preliminary stage includes:

a main comparator having a first input connected to the output of the summation means and a second input connected to the output of the ramp generator, and an output delivering a main pulse control signal, an individual comparator associated with each output of the switching cell, and having a first input connected to the output of the corresponding individual amplification means and a second input connected to the output of the ramp generator, and an output delivering an elementary pulse control signal, nb-2 additional summation means capable of carrying out nb-2 predetermined partial summations of the individual error signals delivered by the individual amplification means, and nb-2 additional comparators connected at their inputs to the outputs of the nb-2 additional summation means and to the output of the ramp generator, and delivering, respectively, additional pulse control signals.

The digital control stage:

controls the injection of the total power into the inductive element and its restitution during each conduction cycle based on the main pulse control signal, and controls the selection means during this conduction cycle based on one of the individual pulse control signals or on one of the additional pulse control signals.

In this embodiment, the control stage advantageously includes memorization means capable of memorizing, at the start of the conduction cycle, the values of the individual pulse control signals and the values of the additional pulse control signals.

According to one embodiment of the invention, compatible with either of the embodiments that have just been mentioned, the switching cell includes two switches connected between a power supply voltage, earth and the inductive element, and controlled by the main pulse control signal. Further, the selection means include, for each output, an individual switch, for example a MOS transistor, connected between the inductive element and the terminal of the corresponding capacitor, and controlled by an individual pulse control signal or by an additional pulse control signal.

Another subject of the invention is a terminal of a wireless communication system, incorporating a switch mode power supply as defined above.

This terminal may form a cellular mobile telephone.

When this terminal includes a battery and an integrated circuit incorporating a processor, the switch mode power supply is fed by the terminal's battery and the regulation voltage of the inputs/outputs of the integrated circuit can be the voltage available on one output of the switch mode power supply, while the regulated power supply voltage of the processor can be the voltage available on another output of the switch mode power supply.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
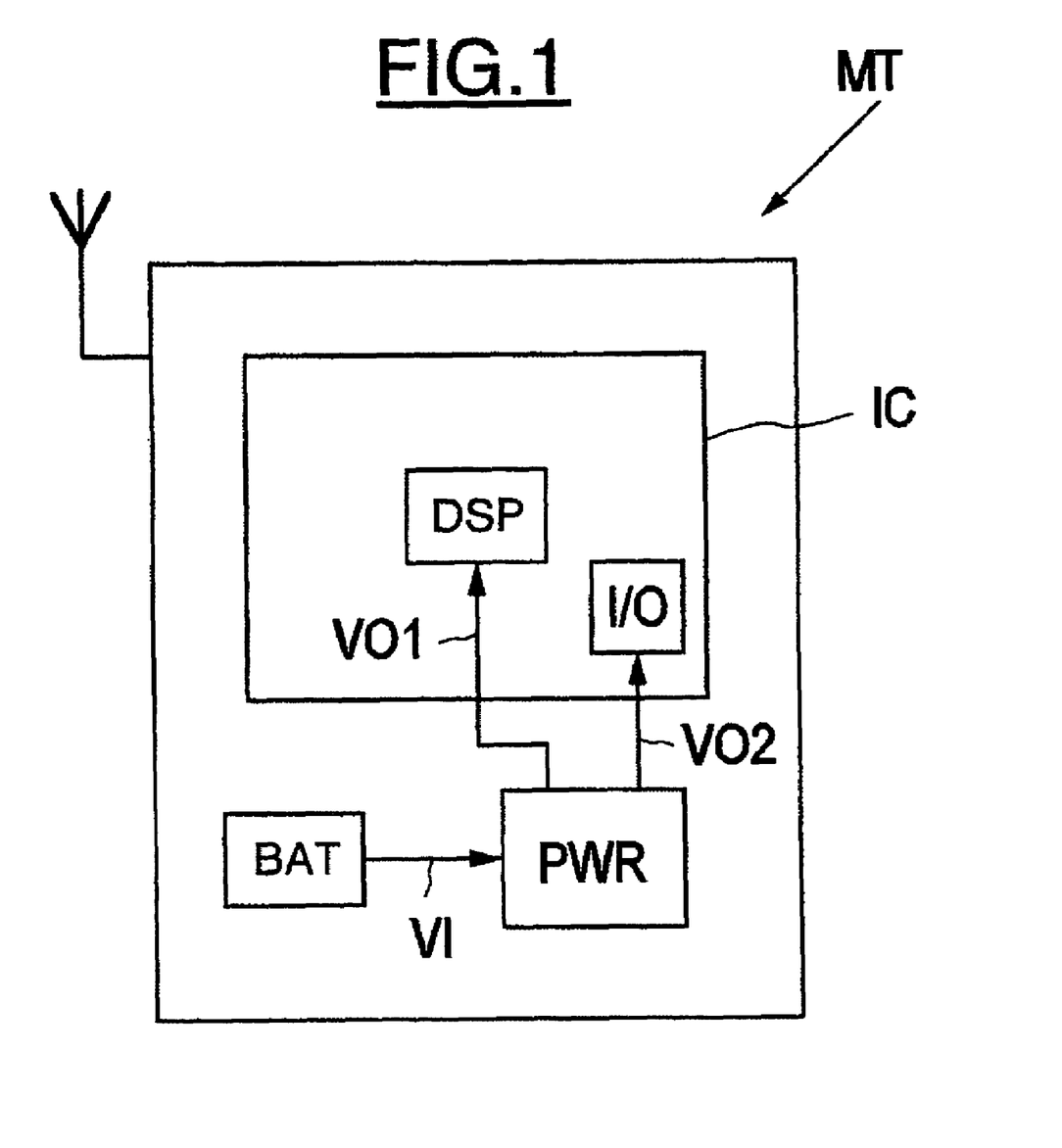
FIG. 1 illustrates in very schematic form a cellular mobile telephone according to the invention, incorporating a switch mode power supply according to the invention.

In FIG. 1, the reference MT denotes in an overall sense a remote terminal of a wireless communication system, for example a cellular mobile telephone. This mobile telephone includes an integrated circuit IC, having a processor DSP and inputs/outputs I/O. The processor DSP is fed by a regulated voltage VO1, delivered by a first output of a switch mode power supply PWR. As a guide, the voltage VO1 is a regulated voltage supply which can be modulated depending on the use and can vary between 0.8 volts and 1.3 volts, for example. Furthermore, the inputs/outputs I/O of the integrated circuit are fed by a second regulated voltage VO2, delivered by a second output of the switch mode power supply PWR. As a guide, this regulated voltage VO2 is equal to 2.1 volts, for example. Furthermore, the switch mode power supply PWR is fed by a power supply voltage VI delivered by a battery. As a guide, this voltage VI can vary, depending on the state of the battery, between 2.5 volts and 5.5 volts.

Reference will now be made more specifically to FIGS. 2 to 8, to illustrate several embodiments of a switch mode power supply PWR according to the invention, and its corresponding control methods. In these examples, the switch mode power PWR is a step-down type power supply device, in the sense that the regulated voltage delivered to each of the outputs of the power supply is equal to the product of the power supply voltage VI and a coefficient a that is less than 1. This coefficient $\alpha$ is the duty factor of the switch mode power supply. This being the case, the invention is not limited to the use of a step-down type switch mode power supply, but could also be applied to a step-up type power supply device, as illustrated in FIG. 9, and which will be described in greater detail later.

Figure 2:
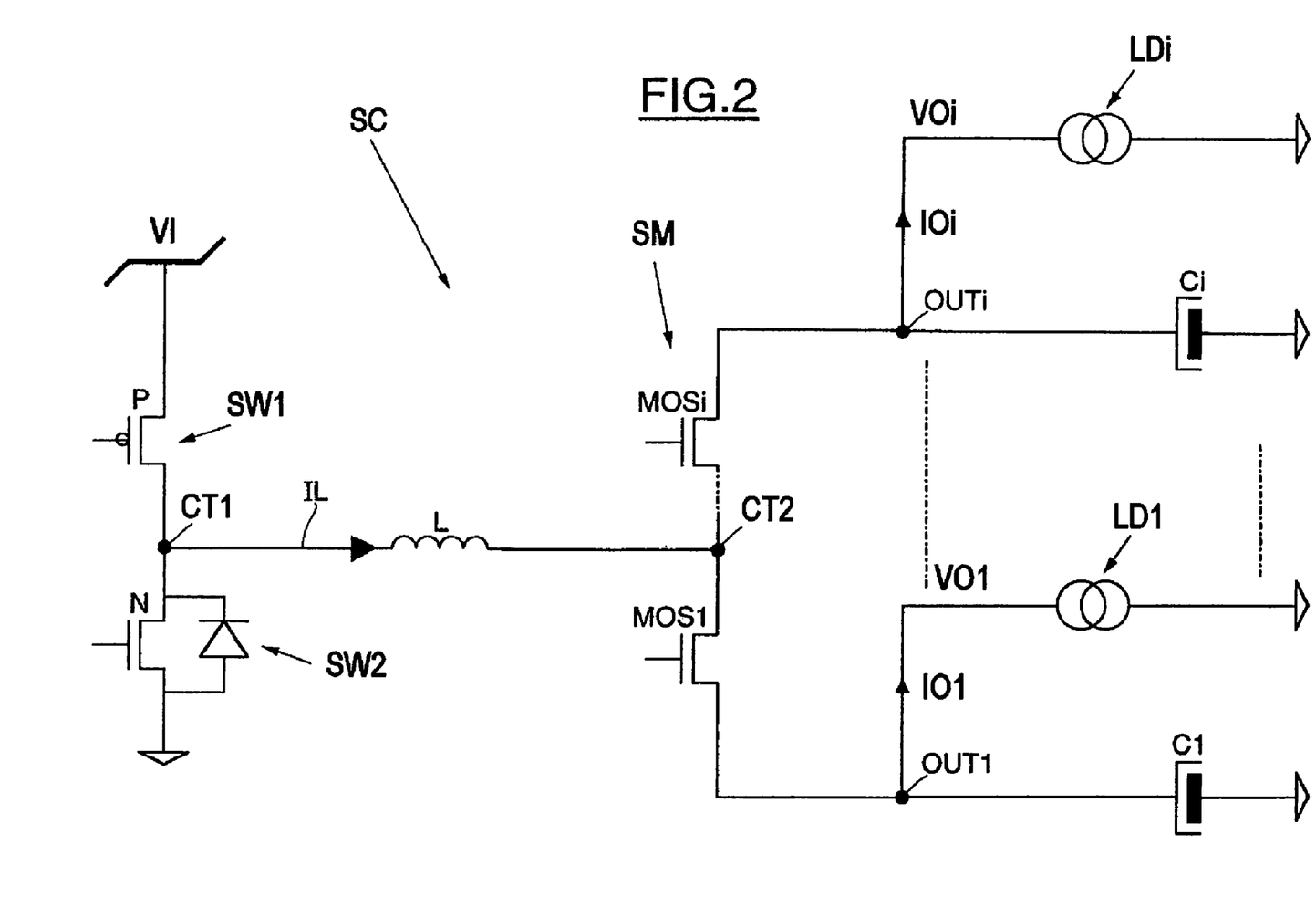
FIG. 2 illustrates in greater detail, but still schematically, a switching cell of a switch mode power supply according to the invention.

The switch mode power supply includes a switching cell SC made up of two switches SW1 and SW2, respectively formed in this example from a p-channel field effect transistor (PMOS transistor) fed by the power supply voltage VI, and by an n-channel insulated gate field effect transistor (NMOS transistor) connected to ground. The switching cell SC also includes in this case only one inductive element L connected between the common terminal CT1 common to the two switches SW1 and SW2, and another terminal CT2.

The switching cell SC has several outputs OUT1-OUTi, which also form the outputs of the switch mode power supply. Each output OUTi is associated with a capacitor Ci, connected between this output and ground. Furthermore, each output OUTi is connected to the terminal CT2 via an individual switch, in this case formed from a selection transistor MOSi, which can be an n- or a p-channel transistor. All the individual switches MOS1-MOSi together form the selection means SM, through which one of the outputs of the switch mode power supply can be selected individually. FIG. 2 also shows, for each output, a load LDi powered by the regulated voltage supply VOi delivered by the corresponding output. Furthermore, a current IOi flows through this load LDi. In the above mentioned example of the cellular mobile telephone application, the load LD1 may be for example the processor DSP, while the load LD2 would be made up of the inputs/outputs I/O of the integrated circuit.

As will be seen in greater detail later, the switches SW1 and SW2 are successively and alternately closed and opened such that energy is stored in the inductive element and then released. The duration of the switches being open and closed during each conduction cycle depends on the duty factor $\alpha$.

According to the invention, as will be seen in greater detail later, the energy stored in the inductive element corresponds to the total energy required by each of the outputs OUTi of the power supply.

The switch mode power supply PWR also includes a control system CS for controlling the switching cell to obtain the desired output voltage at each of the outputs.

Figure 3:
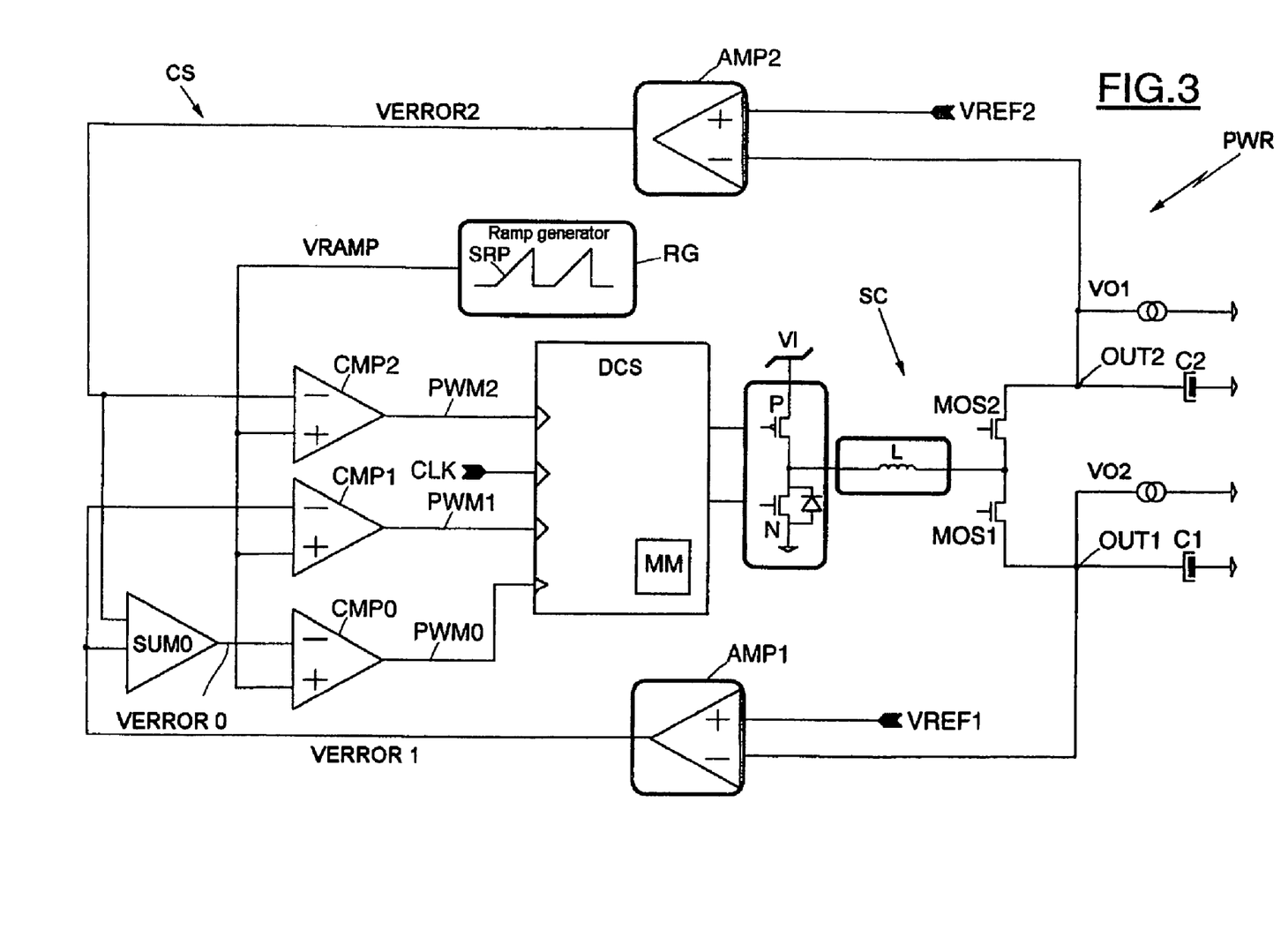
FIG. 3 illustrates in greater detail, but still schematically, a first embodiment of a switch mode power supply according to the invention, having two outputs.

In the example illustrated in FIG. 3, a two-output switching cell is represented. Each of the desired output voltage supplies VO1 and VO2 is a regulated voltage the value of which is set by the value of an external reference voltage VREF1 and VREF2 respectively. It is these reference voltages VREF1 and VREF2 that have for example, in the above mentioned cellular mobile telephone application, as regards voltage VREF1, values that can be adjusted according to use between 0.8 and 1.3 volts, and as regards voltage VREF2, the value of 2.1 volts.

The control system includes a first individual amplification means AMP1, the positive input of which receives the voltage VREF1, and the negative input of which is connected to the first output terminal OUT1. The difference between the external reference voltage VREF1 and the output voltage VO1 is consequently amplified in the error amplifier AMP1, and the corresponding error voltage VERROR1 is an image of the individual power level required at the output OUT1.

The control system likewise includes a second individual error amplifier AMP2 having at its inputs the reference voltage VREF2 and the voltage VO2. This amplifier AMP2 delivers an error voltage VERROR2 which is also representative of the individual power level required at the output OUT2.

The control system CS further includes a summation means SUM0, the two inputs of which are respectively connected to the two outputs of the individual error amplifiers AMP1 and AMP2. The output of the amplification means SUM0 consequently delivers a voltage VERROR0 representative of the total power level corresponding to the sum of the individual power levels respectively required by all the outputs during each conduction cycle.

The control system CS also includes a preliminary control stage in this case made up of several comparators CMP0, CMP1 and CMP2. More specifically, the comparator CMP0, referred to in this case as the main comparator, receives at its negative input the error voltage VERROR0, and at its positive input, a voltage VRAMP corresponding to a ramp signal SRP generated conventionally by a ramp generator RG, the design of which is known per se. The output of the main comparator CMP0 consequently delivers a main pulse control signal PWM0.

Furthermore, the comparator CMP1 is an "individual" comparator, associated with the output OUT1. This comparator CMP1 receives at its negative input the voltage VERROR1 and at its positive input the voltage VRAMP. It delivers an individual pulse control signal PWM1. Likewise, the comparator CMP2 is an "individual" comparator, associated with the output OUT2, and delivering, after having received at its two inputs the error voltage VERROR2 and the voltage VRAMP, an individual pulse control signal PWM2.

Hence, the signals PWM0, PWM1 and PWM2 are pulse signals, the pulses of which have widths modulated by the error voltage level.

The control means of the control system CS furthermore include a digital control state DCS receiving the signals PWM0, PWM1, PWM2 and a clock signal CLK which is furthermore used to reinitialize the ramp generator at the start of each conduction cycle (this operation is carried out on the rising edge of the clock CLK, for example).

Figure 4:
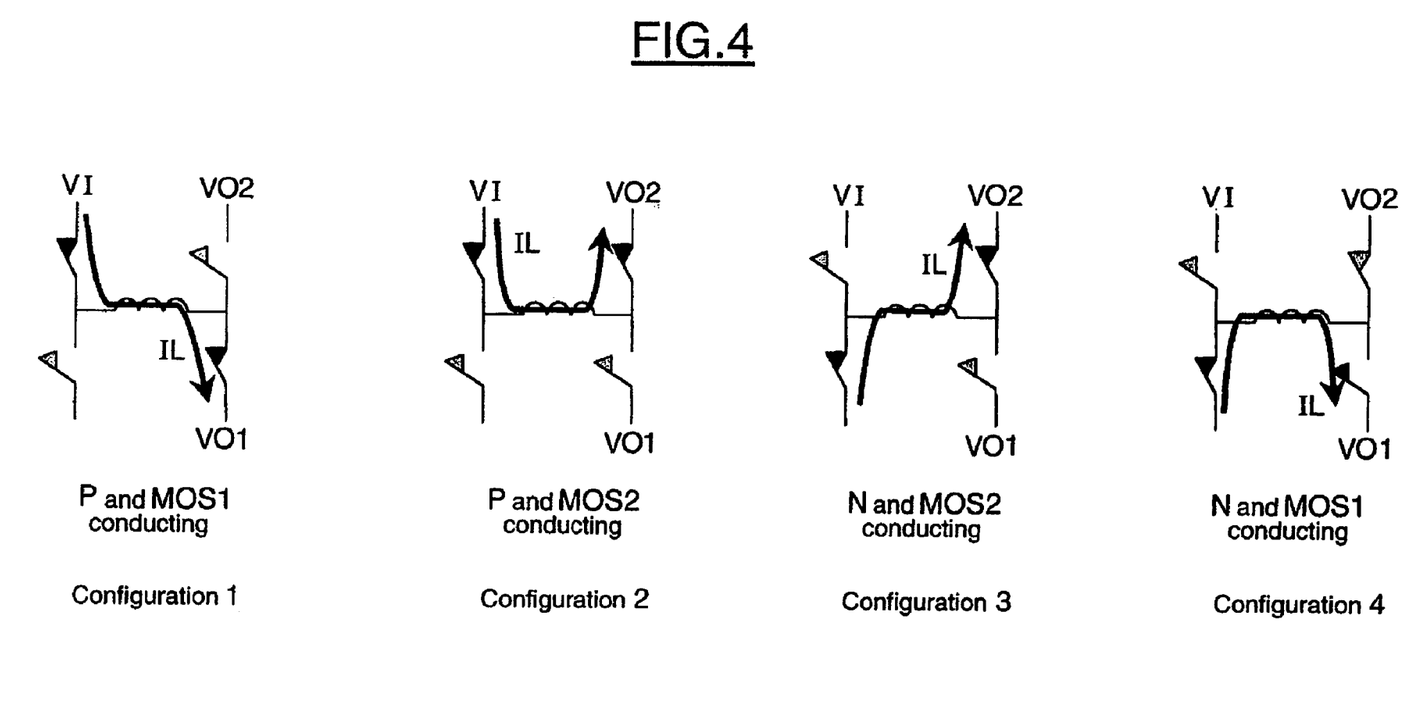
FIGS. 4, 5 and 6 illustrate more particularly one implementation of the method for controlling a switch mode power supply according to the invention.
Figure 5:
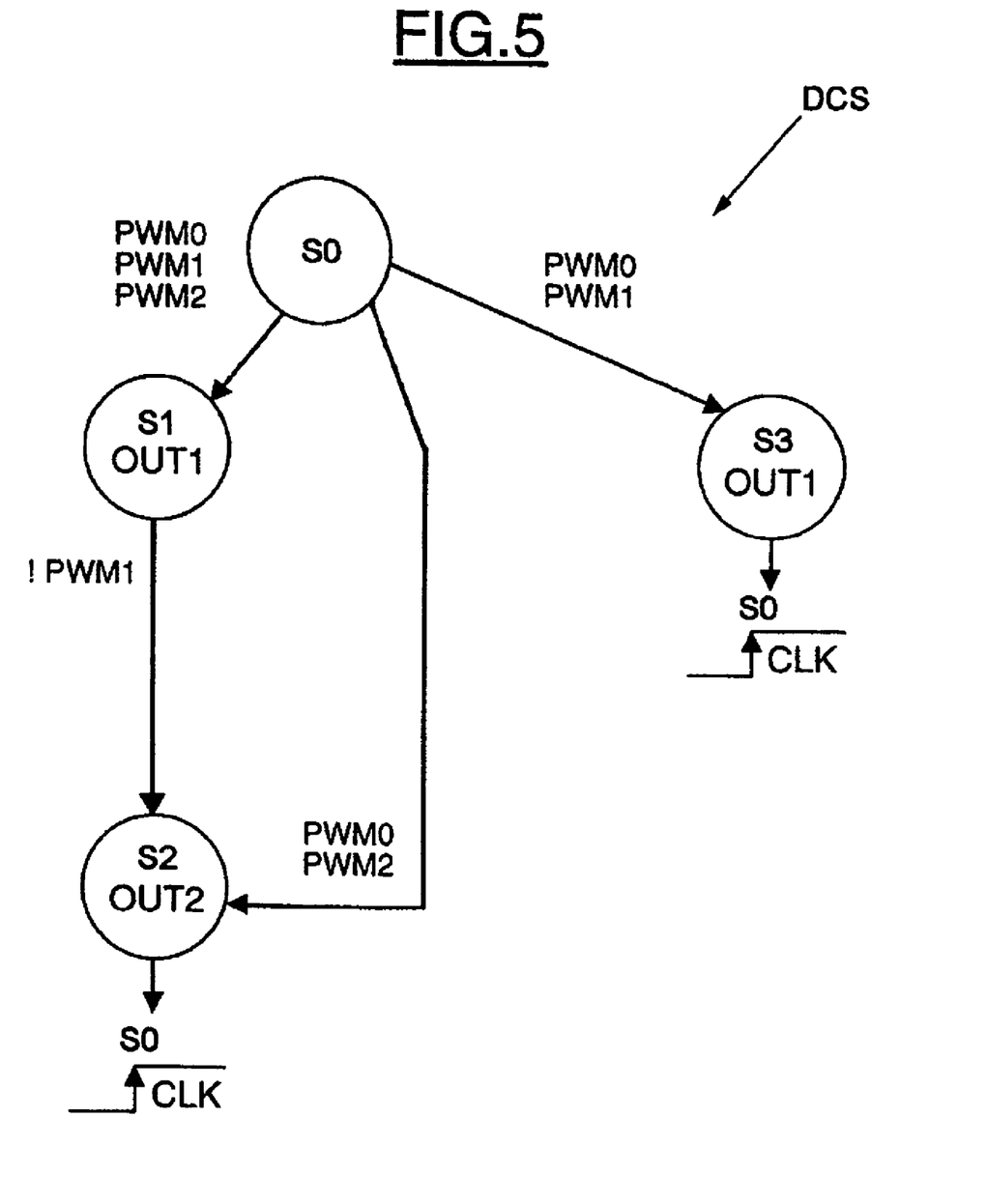

The control stage DCS, which is related to a state machine the diagram for which is represented in FIG. 5, will generate, based on the signals PWM0, PWM1 and PWM2, control signals intended to control the switches SW1 and SW2 of the switching cell SC, and the selection means, that is to say the transistors MOS1 and MOS2. Generally, as illustrated in FIG. 4, for the two-output switch mode power supply, there are four possible different configurations for the switches SW1 and SW2, and for the transistors MOSi of the selection means. In these figures, the reference IL denotes the current flowing through the inductive element L. In configuration 1, the switch SW1 (PMOS transistor) and the transistor MOS1 are conducting. Therefore the output OUT1 is selected. In configuration 2, output OUT2 is selected this time with the switch SW1 and the transistor MOS2 conducting. The output OUT2 may also be selected with configuration 3, in which this time switch IT2 (NMOS transistor) and the transistor MOS2 are conducting. Finally, the output OUT1 may also be selected with configuration 4, in which the switch SW2 and the transistor MOS1 are conducting.

In FIG. 5, the state machine DCS has four states S0, S1, S2 and S3. The means DCS may be implemented for example using logic gates, easily realizable by the person skilled in the art and familiar with the state diagram. State S0 is an initial state that is returned to upon each rising edge of the clock signal CLK, that is to say at the start of each conduction cycle. Furthermore, in this state S0, at the start of each conduction cycle the values of the signals PWM0, PWM1 and PWM2 are memorized in a memorization means MM. These values can be used to determine whether or not each output requires power. Thus, a PWM signal is referred to as "active" when an output requires power and "inactive" otherwise. In addition, by convention, in the diagram of FIG. 5, a PWM signal is considered active when it is not preceded by the symbol "!", while a PWM signal is inactive when it is preceded by the symbol "!".

Generally, according to the invention, the various outputs requiring power will be scanned and selected successively in a predetermined order that is the same for all the cycles. In this way, current continuity is ensured in the inductive element L between the end of one conduction cycle and the start of the next conduction cycle. In the example described here, it is assumed that the selection and scanning order for the outputs is the order 1; 2.

If, in state S0, the signals PWM0, PWM1 and PWM2 are active, this means that each of the outputs OUT1 and OUT2 requires power; the transition is then made to state S1 in which the output OUT1 is selected first. This selection will be performed using the signal PWM1 which will control the switch MOS1. It is recalled here that the signal PWM0 will be used to control the injection and restitution of the total power in the inductive element L.

When the signal PWM1 becomes inactive, that is to say that the output OUT1 has received all the power it required, then the transition to state S2 occurs, in which state the output OUT2 is selected, this selection being initiated here by the signal PWM1 which, upon its transition from the active state to the inactive state, will switch the transistor MOS2 on.

If, in state S0, only the output OUT1 requires power, that is if the signals PWM0 and PWM1 are active, the transition is then made to state S3. In this state, the output OUT1 is selected via the signal PWM1.

If only the output OUT2 requires power (signals PWM0 and PWM2 active), then the transition is made directly to state S2. However, this time, the output OUT2 is selected via the signal PWM2.

Figure 6:
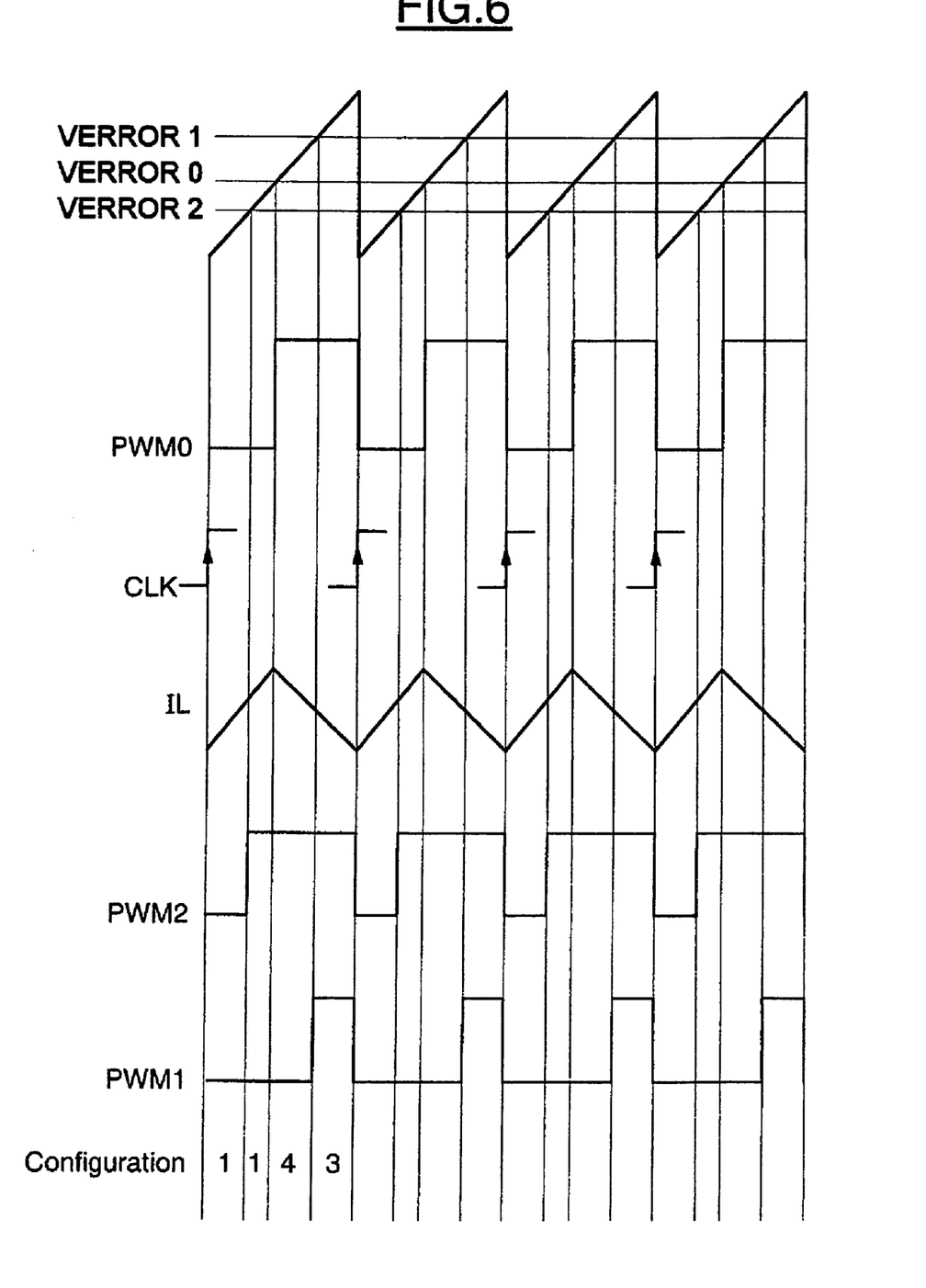

Now a more specific example of operation of the power supply PWR will be illustrated, referring more particularly to FIG. 6. The top part of FIG. 6 shows the voltage VRAMP and the voltages VERROR0, VERROR1 and VERROR2. Furthermore, in this example, the signals PWM1 and PWM2 are considered active in the low state and inactive in the high state. In the same way, when the signal PWM0 is in the low state, it is the switch SW1 that is closed (PMOS transistor on), whereas when the signal PWM0 is in the high state, it is the switch SW2 that is closed (NMOS transistor on).

In the example described, each of the two outputs OUT1 and OUT2 requires power since at the start of the conduction cycle both the signals PWM1 and PWM2 are active. The state machine therefore makes the transition to state S1. In this state, the PMOS transistor (switch SW1) conducts until the voltage VRAMP becomes greater than the voltage VERROR0, which then causes the signal PWM0 to rise to "1" and the NMOS transistor (switch SW2) to start conducting. At the same time, at the start of the conduction cycle, the signal PWM1 is active and remains so until the voltage VRAMP becomes greater than the voltage VERROR1. At that instant, all the power required by the output OUT1 has been delivered to it. Thus, as indicated in the bottom part of FIG. 6, the various switches of the switching cell have successively adopted configurations 1 and 4 of FIG. 4. During these configurations, the transistor MOS1 was switched on by the signal PWM1.

Then, when all the individual energy required by the output OUT1 has been released to this output, the signal PWM1 becomes inactive, which causes the transistor MOS1 to be switched off and simultaneously causes the transistor MOS2 to be switched on. This is because, as indicated above, in this case it is the signal PWM1 that also controls the transistor MOS2, the signal PWM2 not being used in this scenario. At that instant, the remaining energy accumulated in the conductive element L corresponds to the individual energy which must be released to the output OUT2. The end of the conduction cycle therefore results in the switches assuming configuration 3 of FIG. 4.

Figure 7:
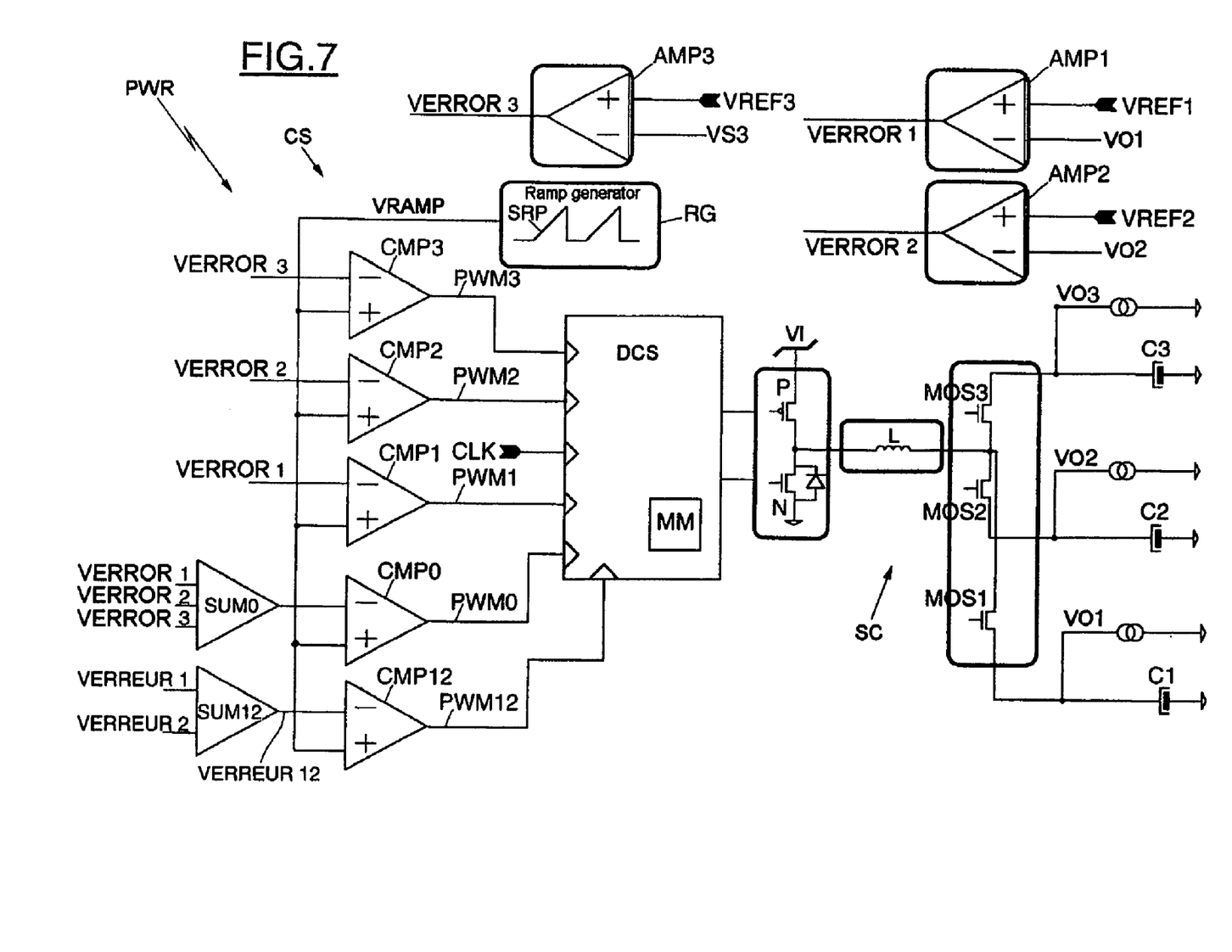
FIG. 7 illustrates schematically a second embodiment of a switch mode power supply according to the invention, having three outputs.

Reference will now be made to FIG. 7 to describe another embodiment of a switch mode power supply according to the invention, having more than two outputs, in this particular case three outputs, OUT1–OUT3. For reasons of simplification, only the differences between FIG. 7 and FIG. 3 will now be described. Compared with the power supply illustrated in FIG. 3, the control system CS of the power supply PWR illustrated in FIG. 7 includes another individual error amplifier AMP3 associated with the output OUT3 and receiving at its two inputs a reference voltage VREF3 and the regulated voltage VO3 delivered by the output OUT3. Furthermore, an additional summation means SUM12 is provided, receiving at its two inputs the error voltage VERROR1 delivered by the amplifier AMP1 and the error voltage VERROR2 delivered by the amplifier AMP2, respectively. The output of the partial summer SUM12 delivers an error voltage VERROR12.

Furthermore, the preliminary control stage also includes another individual comparator CMP3 receiving the voltage VERROR3 and the voltage VRAMP, and delivering an individual pulse control signal PWM3.

This preliminary control stage also includes an additional comparator CMP12 receiving at its inputs the voltage VERROR12 and the voltage VRAMP, and delivering at its output an additional pulse control signal PWM12.

Figure 8:
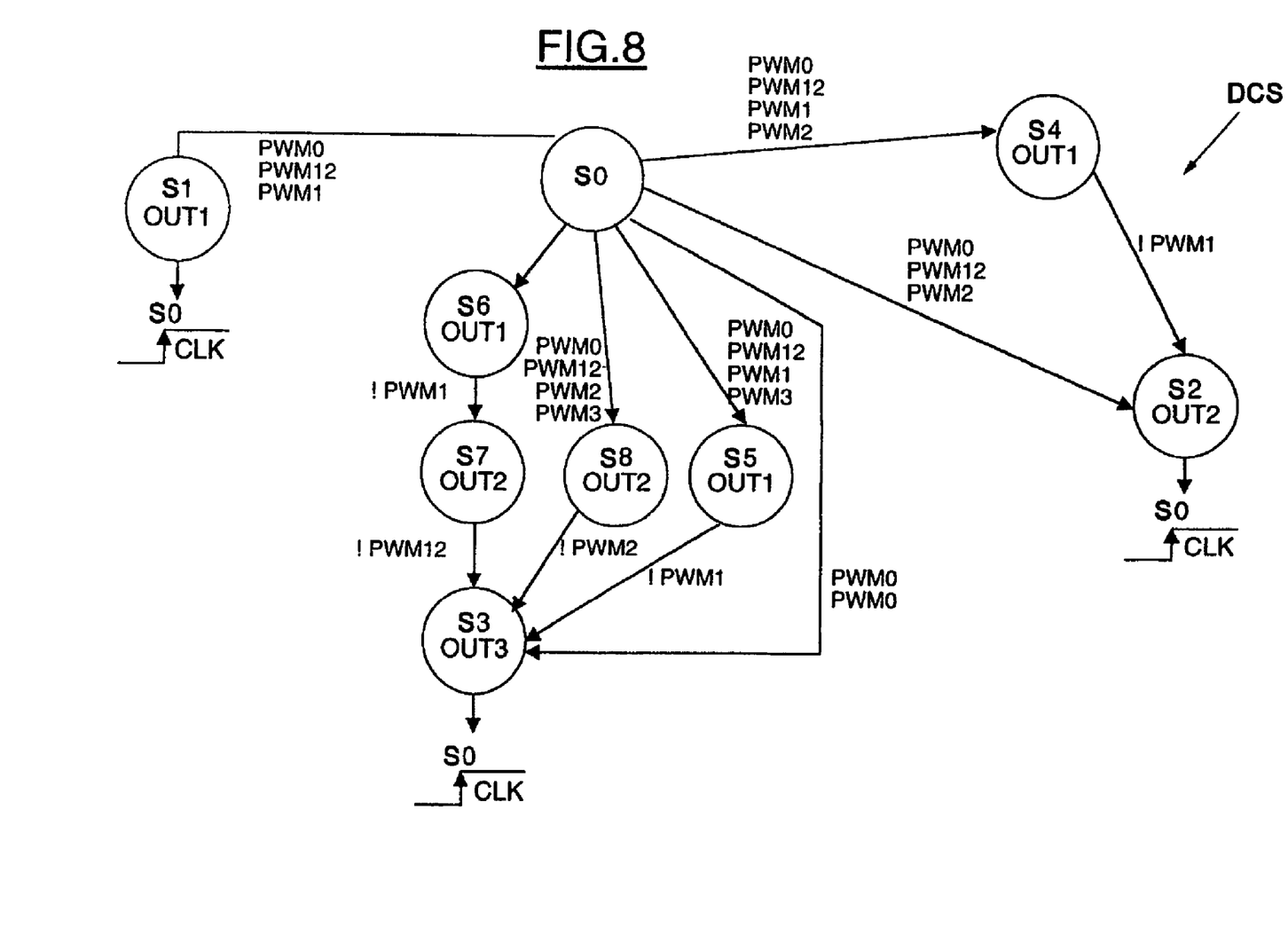
FIG. 8 illustrates partially another implementation of a control method according to the invention, that applies more specifically to a switch mode power supply with three outputs.
Figure 9:
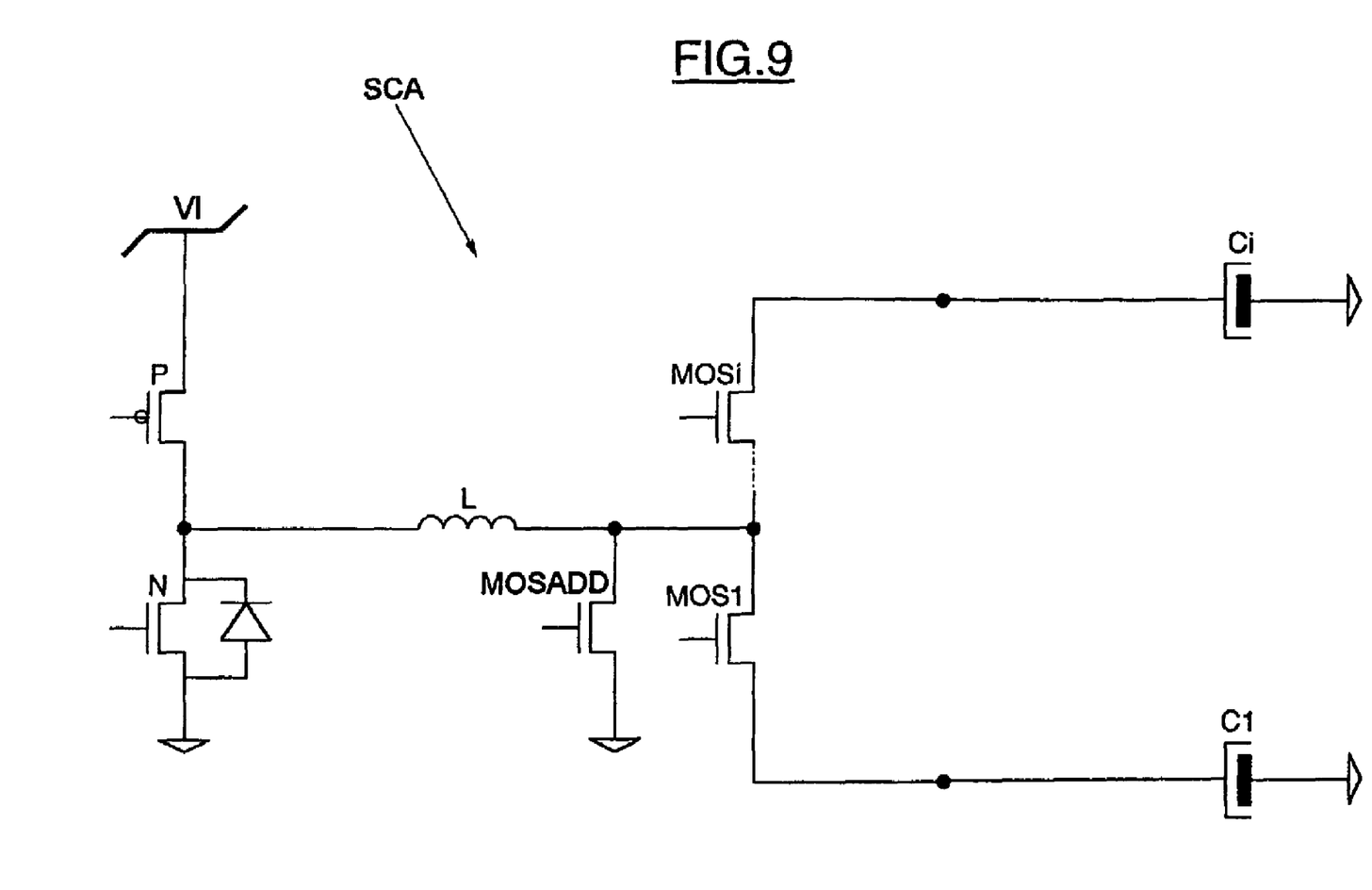
FIG. 9 illustrates schematically another embodiment of a switching cell of a switch mode power supply according to the invention.

In fact, as shall now be seen in greater detail referring more particularly to the state diagram, illustrated in FIG. 8, of the control stage DCS, the means SUM12 and CMP12 are used to create a fictitious output representing, in terms of power level, the sum of the individual power levels required at the outputs OUT1 and OUT2. This fictitious output, for a given configuration, will enable the management to be reduced to that of a two-output power supply, in this particular case the output OUT3 and the fictitious output.

In FIG. 8, which will now be described, the notation conventions are the same as those used in FIG. 5. In state S0, that is to say at the start of the conduction cycle, the values of the signals PWM1, PWM2, PWM3, PWM0 and the value of the additional signal PWM12 are memorized. It is also assumed in this example that the output selection and scanning order is the order 1, 2, 3.

If, in state S0, it is perceived that all three outputs require power, then the transition is made to state S6. In this state, the output OUT1 is first selected via the signal PWM1. Of course, the switches SW1 and SW1 are still controlled via the signal PWM0. When all the individual power required by the output OUT1 has been delivered to it, the signal PWM1 becomes inactive and the transition is then made to state E7. In this state, the output OUT2 is selected via the signal PWM1 having become inactive and then energy is released from the inductive element L towards this output OUT2. This time it is the signal PWM12 that will be used to define at what instant the individual energy requirement of this output OUT2 has been completely released to this output. This is because the signal PWM12 is representative of the sum of the energies required by the outputs OUT1 and OUT2 respectively.

Therefore, when the signal PWM12 becomes inactive, this will mean that all the energy required by the outputs OUT1 and OUT2 will have been released to them. Since the individual energy level of the output OUT1 has already been released to it, the transition of the signal PWM12 to the inactive state will mean that all the energy required by the output OUT2 will have been released to it. At this instant, the transition is made to state S3, selecting, via the signal PWM12, the output OUT3. The remaining energy which has been stored in the inductive element L is then released to the output OUT3 and actually corresponds to the individual energy level required by this output.

For the case in which only the outputs OUT2 and OUT3 require power, the transition will then be from state S0 to state S8, the output OUT2 being selected via the signal PWM2. Then, when this signal becomes inactive, the transition is made to state S3, the output OUT3 being selected, also, by the signal PWM2 having become inactive. The description just given for the transitions between states S0, S8 and S3 also applies for the transitions between states S0, S5 and S3, when only the outputs OUT1 and OUT3 require power. However, when only the output OUT3 requires power, the direct transition from state S0 to state S3 is made, the output OUT3 being selected via the signal PWM3. The explanation given for the transition from states S0 to S3 via state S5 also applies for the path S0-S4-S2, when only the outputs OUT1 and OUT2 require power. However, when only the output OUT2 requires power, the direct transition from state S0 to S2 is made, selecting the output OUT2 via the signal PWM2. Finally, when only the output OUT1 requires power, the direct transition is made from state S0 to state S1, selecting the output OUT1 via the signal PWM1.

That which has just been described with reference to FIGS. 7 and 8 for three outputs can be generalized to nb outputs. In this case, provision will simply be made for nb-2 additional summation means, and nb-2 additional comparators. These summation means will be cascaded, so as each time to form fictitious outputs the power levels of which will equal to the sum of the individual power levels of two outputs, fictitious or actual. In the aforementioned mobile telephone application example, the third output may be used to power the telephone's multimedia means.

The transistors MOSi of the selection means of the switching cell can be n-channel or p-channel transistors. Their choice will depend on the application and on the voltages and on the values of the regulated output voltages. Thus, by way of example, in the cellular mobile telephone application, the transistor MOS1 feeding the processor may be an NMOS transistor, while the transistor MOS2 feeding the inputs/outputs of the integrated circuit will preferably be a PMOS transistor.

As indicated above, the invention is not limited to a step-down type switch mode power supply. Indeed, that which has just been described applies equally to a step-up type power supply, of which an example of a switching cell SCA is illustrated in FIG. 9. This cell SCA differs from the cell SC simply by an additional MOS transistor MOSADD, connected between the inductive element and ground.

The invention is not limited to the embodiments that have just been described but covers all variants thereof. Thus, the individual switches of the selection means SM may be formed of any type of switch that can be realized in integrated-circuit form, for example bipolar transistors or IGBT transistors. The same is true for switches SW1 and SW2.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for controlling a switch mode power supply having a cyclically controllable switching cell (SC) with only one inductive element (L) and several outputs that can be selected individually for connection thereto, comprising, for each conduction cycle:
    injecting a total power level corresponding to the sum of the individual power levels respectively required by all the outputs (OUTi) during this conduction cycle into the inductive element;
    selecting the outputs requiring a non-zero individual power level successively and in a predetermined order that is identical for all conduction cycles; and
    producing, at each selected output, the corresponding individual power level.

2. The method according to claim 1, comprising controlling the switching cell (SC) by pulse-width modulation.

3. The method according to claim 1, wherein selecting comprises electrically connecting the inductive element (L) when the output is selected, and further including determining a total power by:
    determining for each output of an individual error signal (VERROR) resulting from the comparison between the voltage at the output and an individual reference voltage corresponding to the output voltage desired at the said output; and
    summing all the individual error signals so as to obtain a summation signal (VERROR0).

4. The method according to claim 3, wherein injecting is controlled responsive to a comparison between the summation signal and a ramp signal (SRP) reinitialized at the start of each conduction cycle, and wherein selecting is controlled responsive to a comparison between the ramp signal and an auxiliary signal obtained from at least one of the individual error signals.

5. The method according to claim 4, wherein the number of outputs is equal to two, and selecting includes a memorizing, at the start of the conduction cycle, the results of the comparisons between each individual error signal and the ramp signal, and in that the said auxiliary signal is one of the individual error signals.

6. The method according to claim 4, wherein the number nb of outputs is greater than two, and selecting includes making nb-2 predetermined partial summations of individual error signals, and memorizing, at the start of the conduction cycle, the results of the comparisons between each individual error signal and the ramp signal and comparisons between each partial summation signal and the ramp signal, and in that the auxiliary signal is one of the individual error signals (PWM1, PWM2, PWM3) or one of the partial summation signals (PWM12).

7. The method according to claim 1, wherein the switch mode power supply (PWR) is of the step-down type.

8. The method according to claim 1, wherein the switch mode power supply (PWR) is of the step-up type.

9. The method according to claim 1, wherein the switch mode power supply (PWR) is both a step-down and a step-up device.

10. The method according to claim 1, further comprising incorporating the switch mode power supply in a terminal (MT) of a wireless communication system containing a battery and an integrated circuit (IC) incorporating a processor (DSP), such that the switch mode power supply is fed by a battery, supplying a voltage supply to the inputs/outputs of the integrated circuit from one output of the switch mode power supply, and supplying a voltage supply to the processor from another output of the switch mode power supply.

11. The power supply according to claim 1, wherein each output includes a capacitor coupled between the output and a reference potential, and the power measurement circuit comprises a circuit that determines, for each output, an individual error signal resulting from a comparison of a voltage on the capacitor and an individual reference voltage corresponding to a desired output voltage, and determines a total error signal resulting from a summation of the individual error signals.

12. The power supply according to claim 11, wherein the control circuit operates responsive to a main pulse signal resulting from a comparison between the total error signal and a ramp signal reinitialized at the start of each conduction cycle to inject power into the inductive element, and further operates responsive to individual pulse signals resulting from comparisons between an auxiliary signal obtained from at least one of the individual error signals and the ramp signal to determine the amount of time each output is selected.

13. The power supply according to claim 12, wherein the number of outputs is equal to two, and the said auxiliary signal is one of the individual error signals.

14. The power supply according to claim 12, wherein the number nb of outputs is greater than two, the power measurement circuit further making nb-2 predetermined partial summations of individual error signals, and the auxiliary signal comprising at least one of the partial summations and the individual error signals.

15. A switch mode power supply: comprising:
a switching cell, controllable cyclically by a control system, and including only one inductive element and several individually selectable outputs;
the control system including:
determination means capable, during each conduction cycle, of determining a total power level corresponding to the sum of the individual power levels respectively required by all the outputs during this conduction cycle; and
control means (DCS) capable, during this conduction cycle, of controlling the switching cell so as to inject into the inductive element the said total power, selecting successively and in a predetermined order that is identical for all the cycles the outputs requiring a non-zero individual power level and producing at each selected output the corresponding individual power level.

16. The switch mode power supply according to claim 15, wherein the control means include a preliminary stage (CMP1-CMP12) capable of delivering pulse signals of modulated width, and a digital control stage (DCS) receiving the pulse signals and generating control signals for the switching cell.

17. The switch mode power supply according to claim 16, wherein the switching cell includes:
controllable selection means (SM) having an input terminal connected to the inductive element and several output terminals respectively connected to the outputs of the switching cell, and
a capacitor (Ci) associated with each output and having a terminal connected to the corresponding output terminal of the selection means,
wherein the means for determining the total power include for each output an individual amplifier (AMP1, AMP2) having a first input connected to the said terminal of the corresponding capacitor, and a second input receiving an individual reference voltage corresponding to the output voltage desired at the said output, and an output delivering an individual error signal, and a summer (SUM0) the inputs of which are respectively connected to the outputs of the individual amplifiers.

18. The switch mode power supply according to claim 17, wherein the number of outputs is equal to two, and the control means include a ramp generator (RG) capable of delivering, during each conduction cycle, a ramp signal reinitialized at the start of each cycle, and wherein the preliminary stage includes:
a main comparator (CMP0) having a first input connected to the output of the summer and a second input connected to the output of the ramp generator, and an output delivering a main pulse control signal, and,
an individual comparator (CMP1, CMP2) associated with each output of the switching cell and having a first input connected to the output of the corresponding individual amplifier and a second input connected to the output of the ramp generator, and an output delivering an individual pulse control signal,
and in that the digital control stage (DCS) controls the injection of the total power into the inductive element during each conduction cycle based on the main pulse control signal, and controls the selection means during this conduction cycle based on one of the individual pulse control signals.

19. The switch mode power supply according to claim 18, wherein the control stage (DCS) includes a memorizing circuit (MM) capable of memorizing, at the start of the conduction cycle, the values of the individual control signals.

20. The switch mode power supply according to claim 18, wherein the switching cell (SC) includes two switches (SW1, SW2) connected between a power supply voltage, ground and the inductive element, and controlled by the main pulse control signal, and in that the selection means include, for each output, an individual switch (MOSi), connected between the inductive element and the terminal of the corresponding capacitor, and controlled by an individual pulse control signal or by an additional pulse control signal.

21. The switch mode power supply according to claim 17, wherein the number nb of outputs is greater than two, and the control means include a ramp generator capable of delivering, during each conduction cycle, a ramp signal reinitialized at the start of each cycle, and the preliminary stage includes:
a main comparator (CMP0) having a first input connected to the output of the summer and a second input connected to the output of the ramp generator, and an output delivering a main pulse control signal,
an individual comparator (CMP1, CMP2, CMP3) associated with each output of the switching cell, and having a first input connected to the output of the corresponding individual amplifier and a second input connected to the output of the ramp generator, and an output delivering an elementary pulse control signal,
nb-2 additional summers (SUM12) capable of carrying out nb-2 predetermined partial summations of the individual error signals delivered by the individual amplification means, and
nb-2 additional comparators (CMP12) connected at their inputs to the outputs of the nb-2 additional summers and to the output of the ramp generator, and delivering, respectively, additional pulse control signals,
wherein the digital control stage (DCS) controls the injection of the total power into the inductive element during each conduction cycle based on the main pulse control signal, and controls the selection means during this conduction cycle based on one of the individual pulse control signals or on one of the additional pulse control signals.

22. The switch mode power supply according to claim 21, wherein the control stage includes a memorizing circuit (MM) capable of memorizing, at the start of the conduction cycle, the values of the individual pulse control signals and the values of the additional pulse control signals.

23. The switch mode power supply according to claim 15, wherein it is a step-down device.

24. The switch mode power supply according to claim 15, wherein it is a step-up device.

25. The switch mode power supply according to claim 15, wherein it is a step-down and step-up device.

26. A terminal of a wireless communication system which includes a switch mode power supply according to claim 15.

27. The terminal according to claim 26, wherein it is a cellular mobile telephone.

28. The terminal according to claim 26, wherein it includes a battery and an integrated circuit (IC) incorporating a processor, and wherein the switch mode power supply is fed by the battery, and wherein the regulation voltage of the inputs/outputs of the integrated circuit is the voltage available at one output of the switch mode power supply, and the regulated power supply voltage of the processor is the voltage available at another output of the switch mode power supply.

29. A switched mode power supply, comprising:
a single inductive element;
a first switching device coupled between a first voltage potential and a first terminal of the single inductive element;
a second switching device coupled between a second voltage potential and the first terminal of the single inductive element;
a plurality of outputs;
a output selection circuit that selectively couples a second terminal of the single inductive element to individual ones of the plurality of outputs;
a power measurement circuit that determines power requirements for each output and a total amount of power required by the plurality of outputs; and
a control circuit that drives the first and second switching devices and the output selection circuit to inject the required total amount of power into the single inductive element and selectively couple individual outputs to the single inductive element to deliver their individual output power requirements from the single inductive element.

30. The power supply of claim 29 wherein each of the plurality of outputs has a capacitive element coupled between the output and one of the first and second voltage potentials.

31. The power supply of claim 30 wherein the power measurement circuit includes a voltage sensor circuit coupled to each output.

32. The power supply of claim 31 wherein each voltage sensor circuit further includes a comparison circuit that compares the sensed output voltage to a reference voltage to generate an error signal indicative of individual output power requirement.

33. The power supply of claim 32 wherein the power measurement circuit further includes a summer that sums the error signals to generate a total error signal indicative of the required total amount of power.

34. The power supply of claim 33 wherein the control circuit comprises:
a ramp voltage generator;
comparator circuits for comparing the individual error signals and total error signal against a voltage output from the ramp voltage generator to produce a corresponding plurality of pulse width modulation control signals; and
a circuit responsive to the pulse width modulation control signals to drive the first and second switching devices and the output selection circuit.

35. A switch mode power supply, comprising:
a cyclically controllable switching cell and having only one inductive element and several outputs that can be selected individually;
a power measurement circuit that measures, during each conduction cycle, a total power level corresponding to the sum of the individual power levels respectively required by all the outputs for that conduction cycle;
a control circuit that causes the required total power to be injected into the inductive element, successively selects the outputs requiring a non-zero individual power level, in accordance with a predetermined order, for sufficient length of time to deliver the require individual power level from the inductive element.

36. The power supply according to claim 35, wherein control circuit controls the switching cell (SC) by pulse-width modulation.

* * * * *

UNITED STATES PATENT AND TRADEMARK OFFICE
CERTIFICATE OF CORRECTION

| | | |
|---|---|---|
| PATENT NO. | : 7,132,765 B2 | Page 1 of 1 |
| APPLICATION NO. | : 10/726259 | |
| DATED | : November 7, 2006 | |
| INVENTOR(S) | : Christophe Premont et al. | |

It is certified that error appears in the above-identified patent and that said Letters Patent is hereby corrected as shown below:

| | |
|---|---|
| On the title page item (54), and Col. 1, line 1, Title of Invention | Replace "SWITCH MODE POWER SUPPLY HAVING ONLY ONE INDUCTIVE ELEMENT AN SEVERAL OUTPUTS AND METHOD OF CONTROLLING SAME" <br> With --SWITCH MODE POWER SUPPLY HAVING ONLY ONE INDUCTIVE ELEMENT AND SEVERAL OUTPUTS AND METHOD OF CONTROLLING SAME-- |

Signed and Sealed this

Eighth Day of May, 2007

JON W. DUDAS
*Director of the United States Patent and Trademark Office*